(12) United States Patent
Wang et al.

(10) Patent No.: US 6,290,895 B1
(45) Date of Patent: Sep. 18, 2001

(54) SELECTIVELY FLEXIBLE CAUL AND METHOD OF USE

(75) Inventors: Weiping Wang, Schenectady, NY (US); Charles Richard Evans, Cincinnati, OH (US); William Elliot Bachrach, Saratoga Springs, NY (US); John Michael Muldoon, Fairfield, OH (US); Albert Benjamen Crogan, Lewiston, NY (US); Robert Paul Tyler, Harrison, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/415,714

(22) Filed: Oct. 12, 1999

Related U.S. Application Data

(63) Continuation-in-part of application No. 08/950,093, filed on Oct. 14, 1997, now abandoned.

(51) Int. Cl.[7] .................................................. B29C 70/44
(52) U.S. Cl. ........................ 264/510; 264/258; 264/571; 425/389; 425/403; 425/DIG. 44
(58) Field of Search ..................... 425/389, 390, 425/DIG. 44; 264/258, 510, 571; 425/403

(56) References Cited

U.S. PATENT DOCUMENTS

| | | | |
|---|---|---|---|
| 4,608,220 | 8/1986 | Caldwell et al. | 425/389 |
| 5,038,291 | 8/1991 | Wang et al. | 700/98 |
| 5,071,338 | 12/1991 | Dublinski et al. | 425/403 |
| 5,152,949 | 10/1992 | Leoni et al. | 425/389 |
| 5,382,150 | * 1/1995 | Henrio | 425/390 |
| 5,520,532 | 5/1996 | Reinfelder et al. | 425/403 |

OTHER PUBLICATIONS

Wang et al., "Fiber Optic Bend Sensor for In–Process Monitoring of Polymeric Composites," Aug. 1995, ICCM–10, Vancouver, B.C., 7–pages.

* cited by examiner

Primary Examiner—Robert Davis
(74) Attorney, Agent, or Firm—Patrick K. Patnode; Douglas E. Stoner

(57) ABSTRACT

A caul is used in an autoclave process for consolidating a composite, multi-ply, gas turbine fan blade preform having first and second opposite sides and a varying thickness therebetween. The caul includes a body having fibers situated in a matrix. The caul is complementary in shape to the preform first side and has a bending flexibility varying over the body for correspondingly varying consolidation of the preform. The second side of the preform is shaped by a bottom mold in the autoclave chamber.

21 Claims, 8 Drawing Sheets

SELECTIVELY FLEXIBLE CAUL AND METHOD OF USE

RELATED APPLICATION

This application is a continuation-in-part of application Ser. No. 08/950,093 filed Oct. 14, 1997 and now abandoned.

BACKGROUND OF THE INVENTION

This invention relates to composite manufacturing, and, more specifically, to consolidating three dimensional, multiply preforms to net mass and final shape with reduced distortion.

Matched-die compression molding is commonly used in fabricating advanced composites when high dimensional precision and surface strength requirements must be met. However, it can take much more effort to develop a compression molding process than an autoclave process. In compression molding, optimization of preform geometry, thermal cycles, and mold closure is critical to quality of the end product, and control of these process parameters must be very precise.

Geometric features such as thick sections, large variation in cross-sectional thickness or high ply drop-off, and high curvatures in composite parts are known to be difficult to process. In general, the interior and exterior of the material due to low thermal through-thickness conductivity of the composite, are in different cure and viscosity states at any particular point in time. For parts with variable sectional thickness, a thicker section contacts the mold earlier than a thinner one due to the difference in bulk, which further exacerbates the differential pressure during the molding phase.

Fiber wrinkling or buckling, resulting from creeping of the material when under pressure, is an important problem in manufacturing fiber-reinforced composites because such defects can lead to degradation of mechanical performance. This degradation is particularly important in parts such as gas turbine engine composite fan blades which rotate and develop substantial centrifugal loads which must be carried by the structural composite plies.

A typical fan blade includes an airfoil extending radially from root to tip and axially from leading edge to trailing edge. The airfoil root is integrally formed with a suitable dovetail which is used for mounting the individual fan blades to the perimeter of a rotor disk. The airfoil typically twists along its stacking axis from root to tip and has varying curvature or camber therealong. The airfoil increases in thickness from the leading and trailing edges to the midchord regions thereof, and also increases in thickness from the tip to the root. At the root, the airfoil transitions into the dovetail which is substantially thicker for carrying the significant centrifugal loads into the rotor disk during operation.

An exemplary composite fan blade may have several hundred composite plies defining the root, and tapers down to a few hundred composite plies at the inner span of the airfoil. The number of plies further decreases from the airfoil root to its tip down to about one hundred plies thereat.

Each composite ply typically includes a weave or cloth of suitable structural fibers, such as glass or graphite fibers, in a suitable resin matrix. The several plies are individually configured so that when stacked together they collectively define a preform having generally the shape of the resulting fan blade. The preform must be suitably molded to final shape and cured to form the resulting fan blade.

As indicated above, a pair of matching dies may be used to compression mold the preform to final shape. Or, an autoclave process may be used wherein the preform is positioned atop a single mold, with a uniformly flexible caul positioned atop the preform for providing a surface against the pressurized gas used to conform the preform to the mold under heat and forming the fan blade.

In both processes, consolidation of the preform is required during which the thickness of the preform is reduced under pressure and temperature with corresponding cross linking and curing of the matrix to form the final configuration of the part or blade.

During the molding process, the preform inherently undergoes plastic deformation as it is molded to shape. In view of the varying thickness of the exemplary fan blade and its complex three-dimensional configuration, the amount of thickness compression and plastic deformation of the preform correspondingly varies. For example, the dovetail is relatively thick and uniform and transitions sharply to a narrower neck region at the root of the airfoil. In this region, the number of plies in the preform decreases substantially on the order of a several hundred ply decrease. The amount of ply variation along the remainder of the airfoil to its tip is relatively small in comparison, also with relatively small transition in thickness throughout the relatively thin airfoil.

Accordingly, under pressure and temperature, consolidation of the preform varies with typically more consolidation at the thicker dovetail and less consolidation at the airfoil tip. In the matched-die compression molding process described above, die travel is necessarily uniform over the entire surface area of the preform, with the thicker, dovetail portion contacting the mold earlier than the thinner tip portion. This is necessary to ensure effective consolidation at the root without undesirable overcompression at the tip which would misshape the final blade. As a result of this process, the preform is susceptible to undesirable wrinkling or buckling, especially in regions of the blades having large thickness variation such as at the root. Porosity, delamination, and other defects are also possible during the process.

In the autoclave process described above, a uniform pressure is applied atop the preform without use of a rigid top mold, thus making it difficult to achieve good dimensional control.

In both processes, therefore, critical dimensional and process control is required to minimize undesirable defects in the consolidation process for creating accurately dimensioned fan blades. Nevertheless, defective fan blades are still produced and must be rejected, thereby increasing the overall cost of producing acceptable fan blades.

Accordingly, it is desirable to improve consolidation in varying thickness preforms for reducing undesirable defects such as wrinkles, porosity, and delamination.

SUMMARY OF THE INVENTION

A caul is used in an autoclave process for consolidating a composite preform having first and second opposite sides and a varying thickness therebetween. The caul includes a body that is complementary to the preform first side and has a bending flexibility that varies over the body for correspondingly varying consolidation of the preform.

DESCRIPTION OF THE PREFERRED EMBODIMENT(S)

Figure 1:
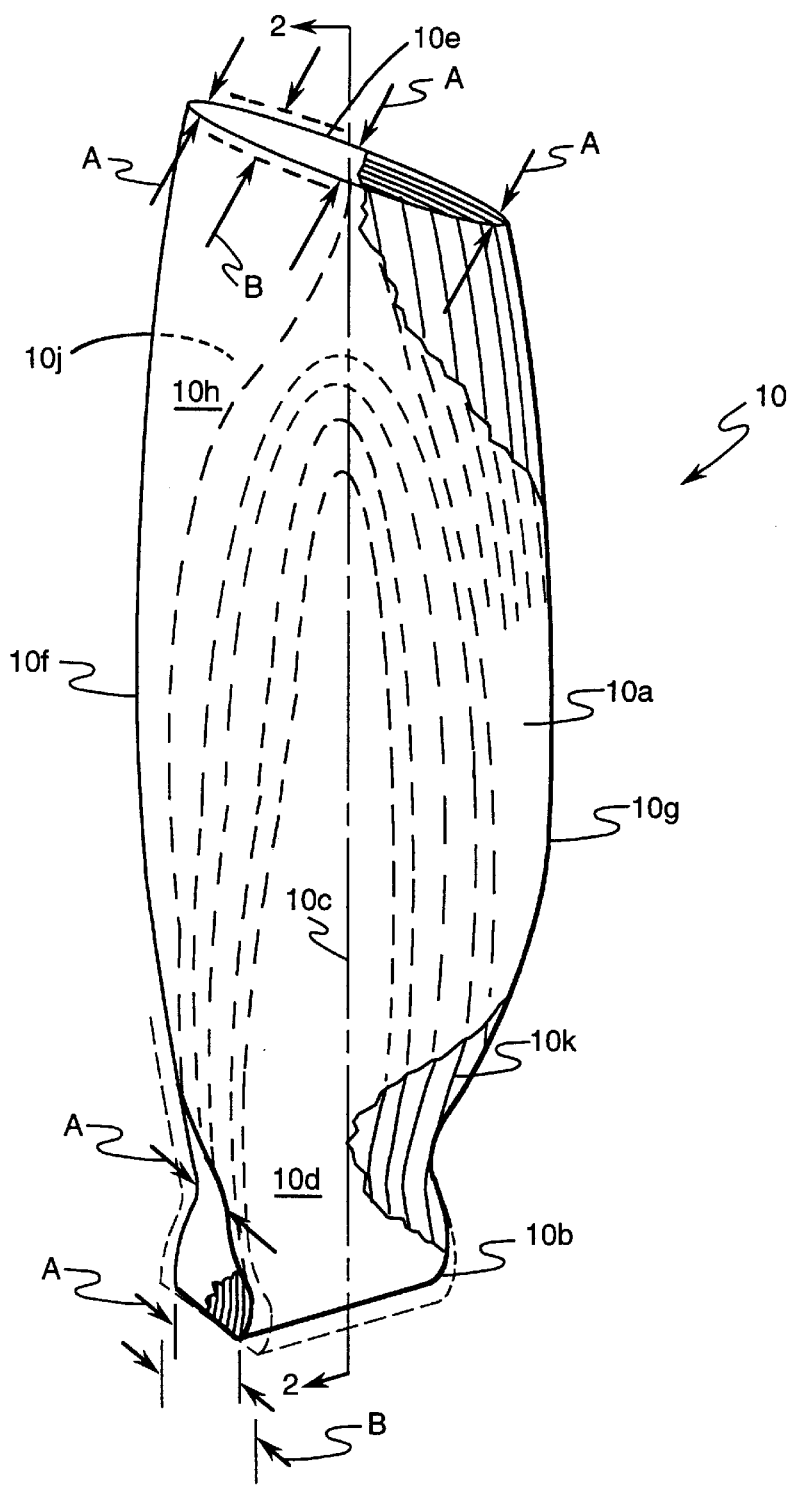
FIG. 1 is a partly cut away elevational view of an exemplary gas turbine engine composite fan blade manufactured in accordance with one embodiment of the present invention.

FIG. 1 illustrates an exemplary gas turbine engine composite fan blade 10 fabricated in accordance with the invention. Blade 10 includes an airfoil 10a and an integral dovetail 10b having a common stacking axis 10c extending between the airfoil and dovetail. The airfoil includes a radially inner root 10d, a radially outer tip 10e and axially spaced apart leading edge 10f and trailing edge 10g. Blade 10 also includes a first or suction side 10h and an opposite, second, or pressure side 10j.

Blade 10 may take any suitable configuration, including a pattern that varies three-dimensionally over the entire length of its stacking axis. Thus blade 10 is shown with a thickness A which varies from the dovetail to the tip, and between its leading and trailing edges. Airfoil 10a is typically highly twisted along stacking axis 10c from the root to tip as conventionally required for aerodynamic reasons, and the airfoil curvature at each radial section between the leading and trailing edges also varies as required for aerodynamic performance, with mid-chord sections near the stacking axis being thicker than the leading and trailing edges.

Fan blade 10 is conventionally configured as a layup of a plurality of composite plies 10k laterally stacked together between the sides of the blade. Each of the plies 10k is specifically configured in shape so that collectively the plies 10k form the desired three dimensional profile of the blade 10.

Figure 2:
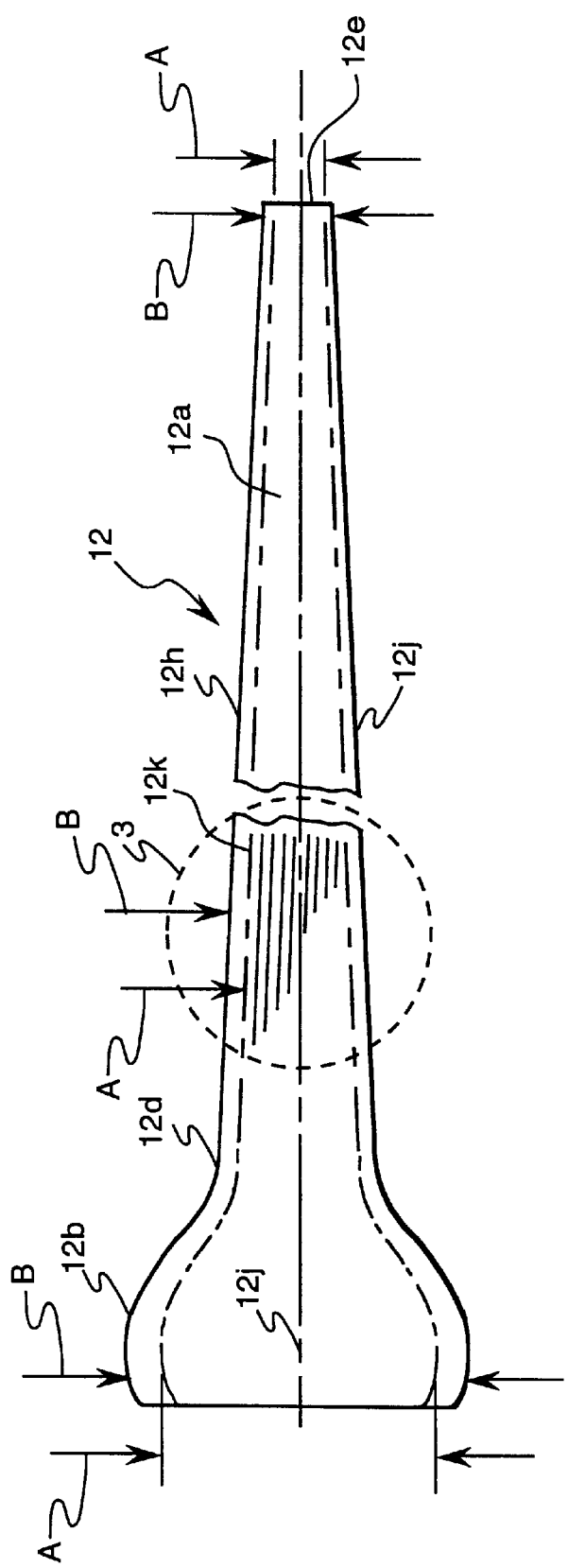
FIG. 2 is a radial cut away view along the stacking axis of the fan blade illustrated in FIG. 1 and taken along line 2—2, showing (in solid line) an exemplary composite preform used to form the fan blade (shown in phantom).

The fan blade 10 illustrated in FIG. 1 is formed from a substantially identical preform 12 illustrated in FIG. 2. Preform 12 is the initial, uncured state of fan blade 10 which is initially thicker, as represented by its varying thickness B, than the blade thickness A at corresponding portions. Thus preform 12 is thicker than blade 10, but otherwise shaped identical to blade 10. Since preform 12 is merely the initial form of the final fan blade 10, it includes corresponding parts such as an airfoil 12a to composite plies 12k, directly corresponding to the same components 10a–k, respectively, for the final fan blade.

Figure 3:
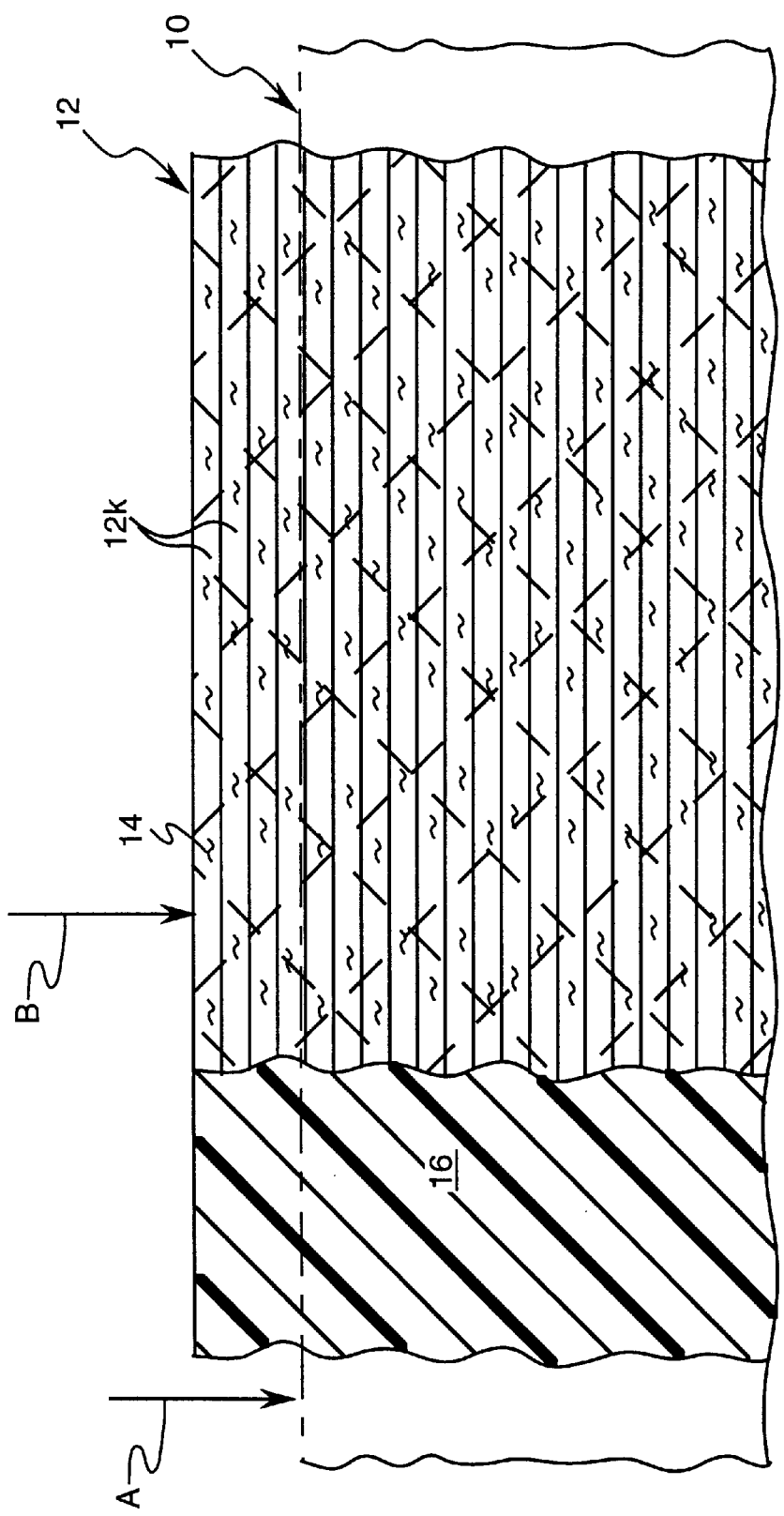
FIG. 3 is an enlarged sectional view of a portion of the preform illustrated in FIG. 2 within the circle labeled 3.

Preform 12 may take any conventional form, and FIG. 3 illustrates an exemplary section thereof. Each individual composite ply 12k includes a conventional structural fiber 14, such as glass or graphite, in a suitable resin matrix 16. Fibers 14 may be in any configuration, such as tape or woven cloth with suitable directional orientation. The tape or cloth may be conventionally pre-impregnated with resin matrix 16. Exemplary compositions of composite plies 12k include fiber-thermoset epoxy, fiber-thermoplastic, fiber-bismaleimide, and chopped fiber-epoxy/bismaleimide, or a neat resin such as thermoplastic or thermoset, or an elastomer. In an exemplary configuration, dovetail 12b has about several hundred composite plies which taper down to a few hundred composite plies at root 12d. The number of plies decreases to about a hundred at tip 12e.

Figure 4:
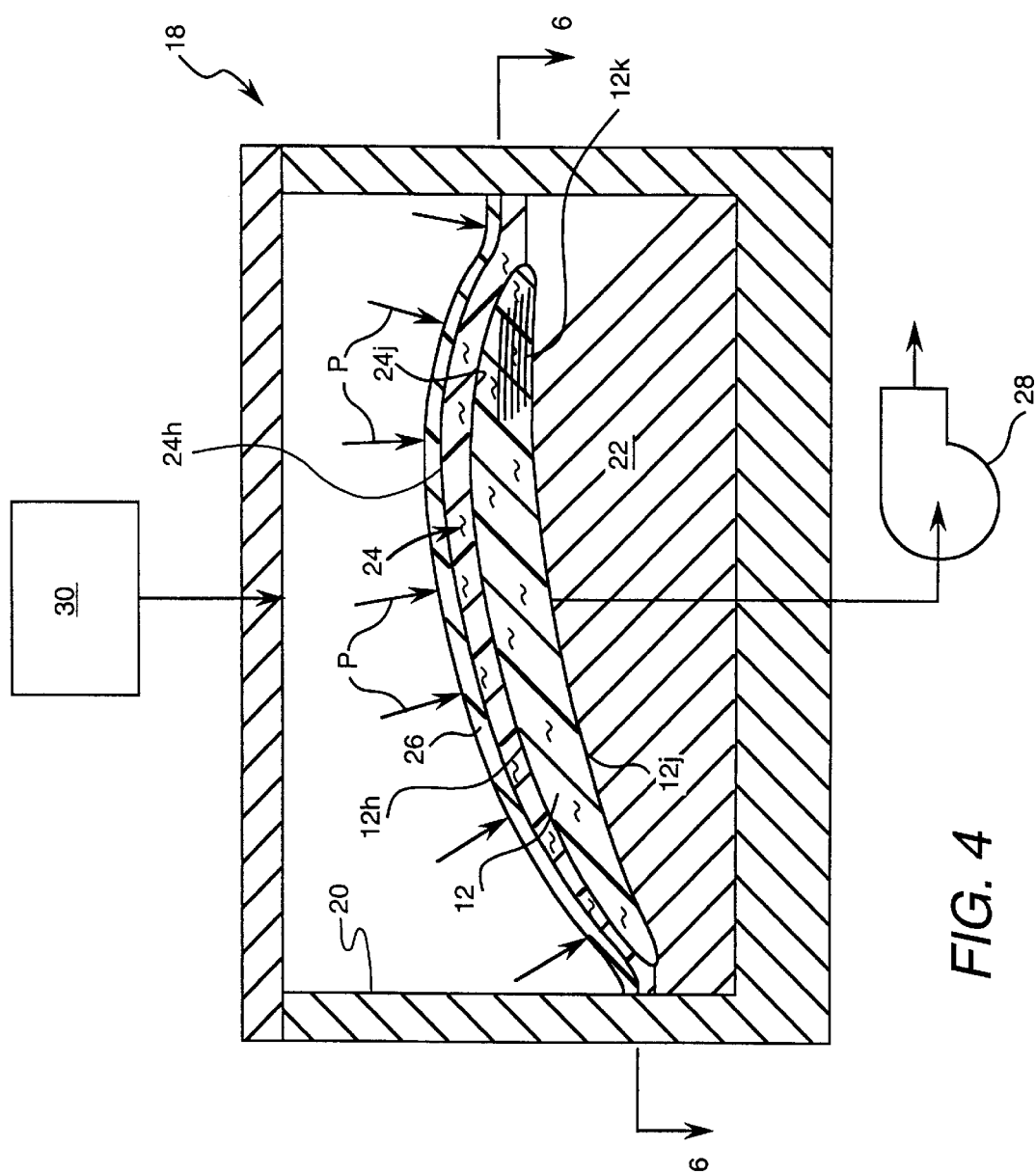
FIG. 4 is a schematic representation of an autoclave in accordance with an exemplary embodiment of the present invention, also showing a caul atop the preform of FIG. 2.

In accordance with the invention as illustrated in FIG. 4, preform 12 is disposed in a conventional autoclave 18 to undergo consolidation and curing to form a final, cured fan blade 10. Autoclave 18 includes a pressure chamber 20, and a bottom mold 22 disposed in chamber 20 and configured to define the second side 12j of preform 12. Preform 12 is positioned atop bottom mold 22 with its second side 12j in contact with mold 22.

In accordance with the invention, a specifically configured caul 24 is positioned atop the preform 12. A conventional flexible vacuum sheet 26 is positioned atop caul 24 to provide an effective vacuum seal thereover. A conventional vacuum pump 28 is operatively joined to chamber 20 for initially evacuating air from preform 12. Conventional means 30 are operatively joined to chamber 20 for heating the chamber and pressurizing the chamber to a suitable pressure P to compress caul 24 and consolidate the preform plies 12k to final shape as the preform undergoes curing.

Caul 24 provides an effective molding tool which conforms to the shape of preform 12 during the debulking or pre-cure cycle, which requires less heat than the curing cycle and thus takes place at a lower temperature and a shorter time than the curing cycle, so that the preform resin isn't cured at this time. The caul also conforms to the shape of the preform during the autoclave manufacturing process or curing cycle. Thus, while the thickness of preform 12 is reduced during these cycles, the shape of preform 12 remains unaltered. The caul provides stability to the composite plies by distributing the pressure loading throughout the preform during consolidation without causing any shifting or relative movement between adjacent plies. This leads to a decrease in manufacturing defects such as wrinkling and delamination between the ply layers.

As shown in FIG. 4, mold 22 forms the second side 12j of the preform, with caul 24 being configured to form the first side 12h of the preform. The caul therefore is shaped to conform or correspond to the general shape of both the fan blade and preform 12.

Figure 5:
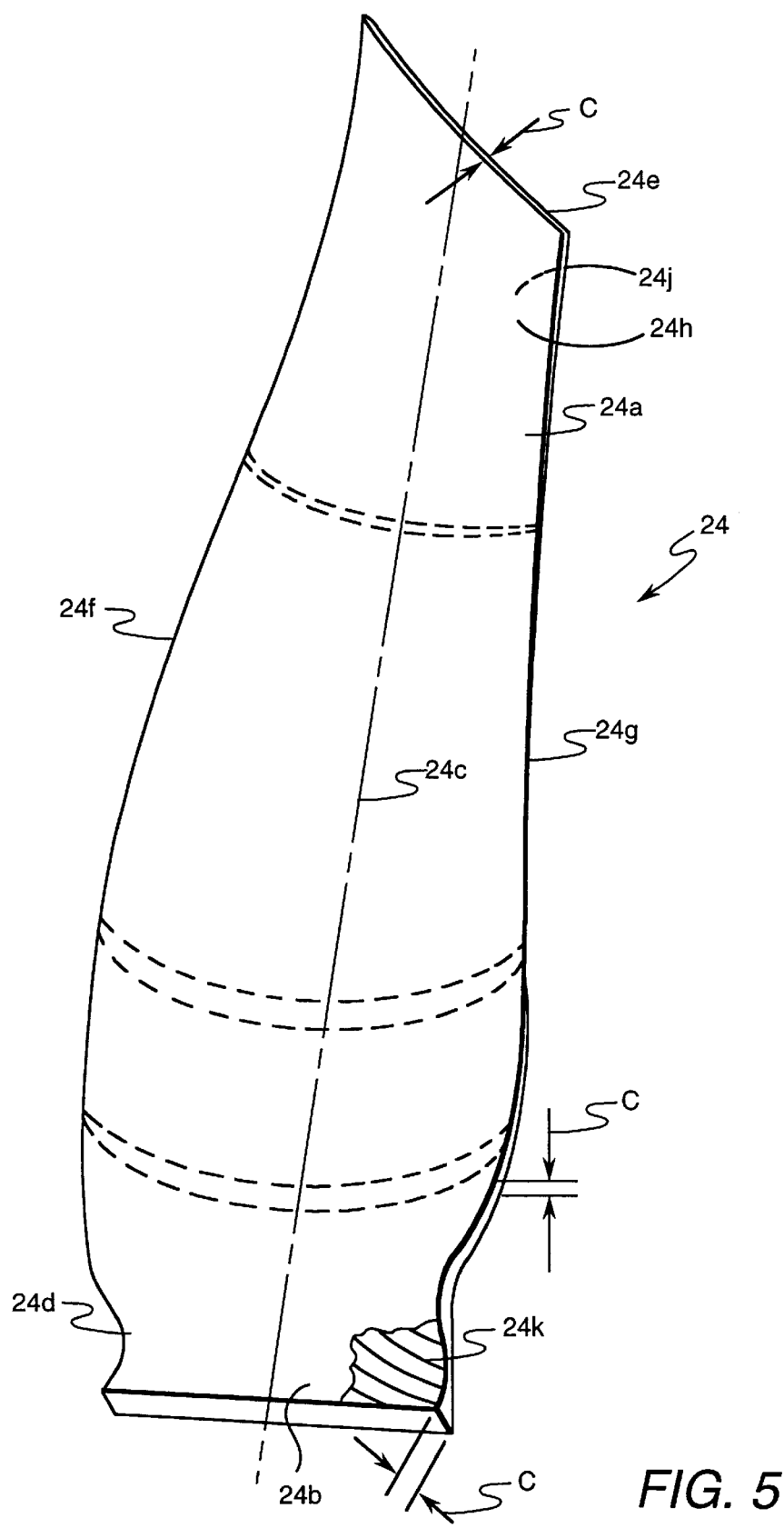
FIG. 5 is an elevational view of the caul illustrated in FIG. 4 for use in forming the fan blade of FIG. 1 from the preform of FIG. 2.

FIG. 5 illustrates an embodiment of caul 24 which includes an airfoil region 24a, a dovetail region 24b, a longitudinal axis 24c, a root 24d, a tip 24e, a leading edge 24i, a trailing edge 24g, a top or outer side 24h, and a bottom or inner side 24j.

Caul 24 has a structural body 24k which is preferably a composite and includes a plurality of plies. The caul is configured to conform to the preform first side 12h, and its bottom side 24j is therefore complementary therewith, and has a bending flexibility which varies over its body for preferentially or selectively varying consolidation of the preform in a suitably corresponding manner to reduce or eliminate defects such as wrinkling, porosity, and delamination of the plies. As shown in FIG. 5, caul body 24k has a thickness C which predeterminedly varies over caul 24 to effect desirable variations in bending flexibility between relatively stiff and pliable portions thereof. By varying the bending flexibility of caul 24 over a range from minimum, or relatively stiff, to maximum, or relatively pliable, flexibility to correspond with effecting maximum and minimum consolidation, respectively, in preform 12, defects may be reduced or eliminated.

As indicated above with respect to FIG. 2, the elongate preform 12 undergoes a decrease in thickness B from dovetail 12b to airfoil root 12d, and in turn to tip 12e. During initial stackup of preform plies 12k, air in the form of voids is trapped within the assembly. Accordingly, during consolidation, compression loading squeezes together the several preform plies 12k to expel the voids, with the curing process also affecting the amount of consolidation achieved.

As a general rule, more consolidation and contraction of preform plies 12k is required at the initially larger thickness regions such as at the dovetail 12b and root 12d, as compared to the relatively thin tip 12e which requires correspondingly less consolidation or contraction. When caul 24 is positioned in the autoclave, caul root 24d is positioned atop preform root 12d, and caul tip 24e is positioned atop preform tip 12e. The caul preferably increases in bending flexibility from its root 24d to its tip 24e to correspond with the decreasing thickness from preform root 12d to preform tip 12e.

In the region of preform dovetail 12b and root 12d, more constraint is required to prevent plastic distortion which leads to undesirable wrinkling. By providing a corresponding amount of stiffness or rigidity in caul dovetail 24b and root 24d, suitable constraint is provided in this region of preform 12. However, radially outwardly above preform root 12d, the thickness varies or tapers slightly, and the amount of consolidation required is also more uniform, as well as less than that required at preform dovetail 12b. Caul 24, therefore, is more flexible and more readily complies with the preform 12 under the applied pressure P.

Figure 6:
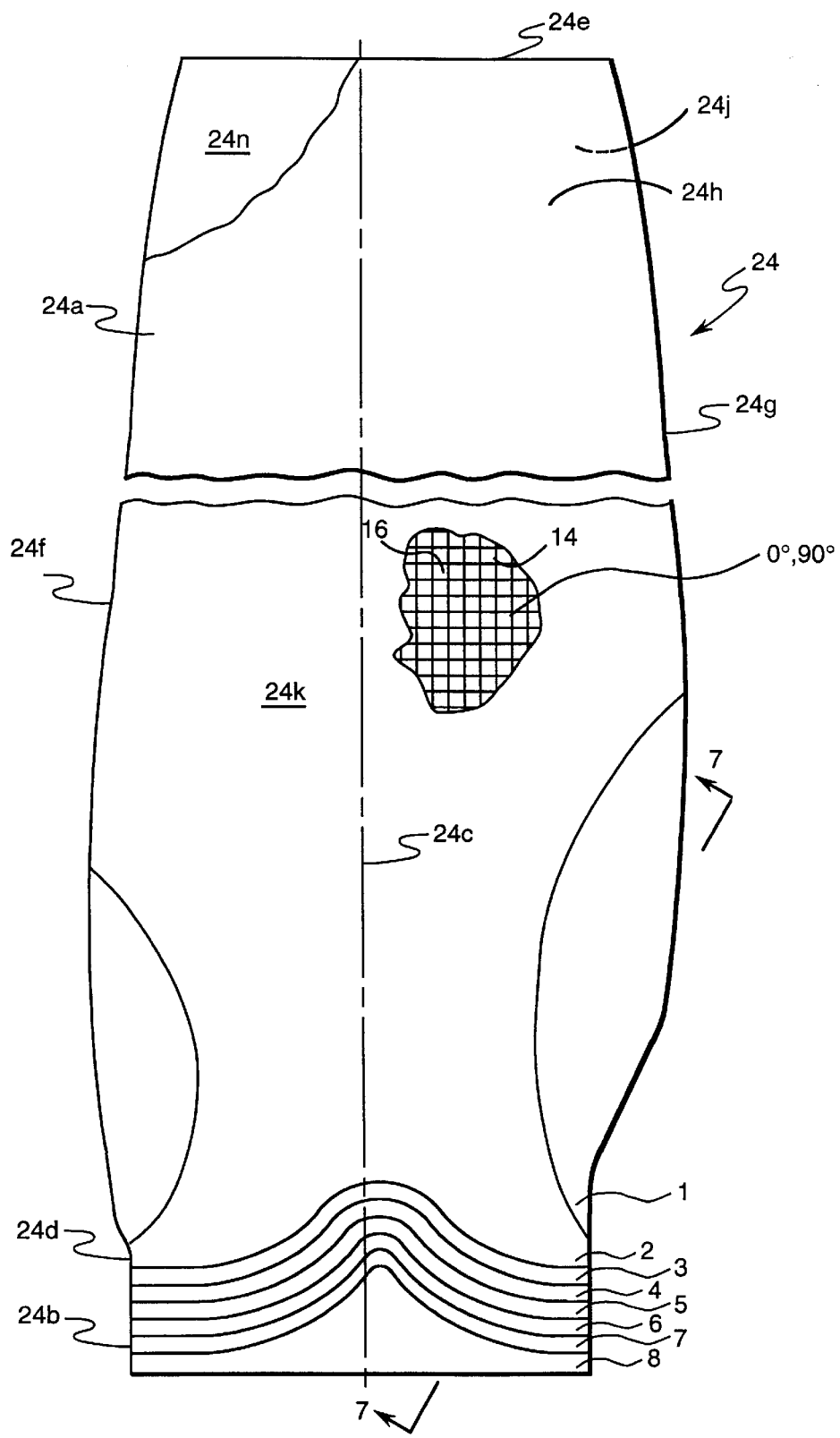
FIG. 6 is a plan view of the caul illustrated in FIG. 4 and taken generally along line 6—6 in FIG. 4 showing an exemplary first embodiment thereof.
Figure 7:
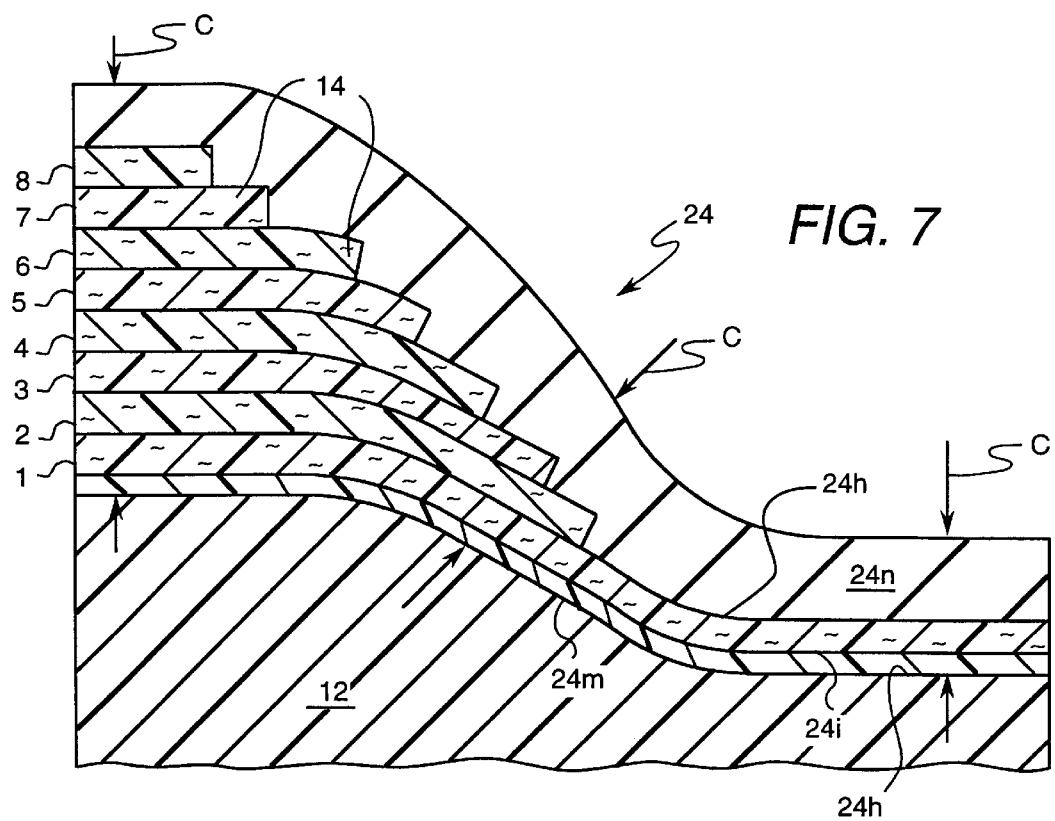
FIG. 7 is an enlarged sectional view of a portion of the caul illustrated in FIG. 4 and taken along line 7—7 of FIG. 6.

A first embodiment of caul 24 is illustrated in FIGS. 6 and 7. As indicated above, body 24k of caul 24 is preferably in the form of a plurality of overlapping composite plies, shown individually numbered 1–8. FIG. 7 illustrates an exaggerated cross section of caul 24 with the overlapping composite plies 1–8. Like preform 12 itself, each of the caul plies 1–8 includes a suitable structural fiber 14 in a suitable resin matrix 16. Fiber 14 may take any suitable form, such as a tape or woven sheet of fibers which is preferably pre-impregnated with the resin matrix 16. Fiber 14 may be of any suitable composition, such as glass or graphite, and the resin matrix may be of any conventional composition such as those listed above for preform 12 itself. Fiber 14 and matrix 16 are visible in FIG. 6 through a cut-away portion of top or outer side 24h.

As shown in FIG. 6, the individual plies 1–8 which form caul 24 are individually configured so that, upon stackup and curing, they provide the desired variation in bending flexibility along the radial and axial extent of caul 24. The caul bottom side 24j is positioned above a suitable mold (not shown) corresponding with the desired profile of the airfoil top or first side 10h (FIG. 1) for use in defining that side in the preform. As illustrated in FIG. 7, caul 24 uses the eight plies 1–8 stacked atop each other, which corresponds to a total thickness of about 40–50 mils. As shown in FIG. 6, the caul plies 1–8 are disposed generally symmetrically about the longitudinal or radial stacking axis 24c to correspond with the symmetry of the fan blade itself. As a result of this symmetry, as illustrated in FIG. 6, the majority of caul airfoil 24a includes only two structural plies 1 and 2, having a total thickness of about 10–15 mils extending downwardly from caul tip 24e along both sides and the leading and trailing edges 24f, 24g, down to about the caul root 24d. The number or quantity of plies preferably increases from tip 24e to root 24d which, in the FIG. 6 embodiment, is localized near root 24d. From caul root 24d to the bottom of dovetail 24b the number of plies increases sequentially from 2, 3, 4, 5, 6, 7, to 8. After layup of the initial plies 1–8, caul 24 is, conventionally, itself consolidated and cured to complete its manufacture. The result is a one-piece unitary solid member having predetermined bending flexibility along its radial and axial extent, controlled in most part by the number of plies, orientation, and configuration in the same manner as any engineered composite structure.

As shown in FIG. 7, caul 24 preferably includes a flexible liner 24m integrally joined to the bottom side 24j of the caul body for engaging in abutting contact the preform top side 12h (FIG. 4) in controlling surface finish thereof. Liner 24m may be formed of a suitable elastomer having a smooth finish so that the finish of the preform is correspondingly smooth.

Caul 24 preferably also includes a flexible cover 24n integrally joined to the top side 24h of the caul body for protecting the caul body. Cover 24n may be formed of rubber for example, and has a suitable thickness for improving ease of handling of the caul itself while being sufficiently flexible to prevent undesirable restraint of structural plies 1–8. The optional liner and cover 24m and 24n improve the use of caul 24, with liner 24m being disposed in direct contact with the preform first side 12h (FIG. 4) in the autoclave, with vacuum sheet 26 thereof disposed atop cover 24n.

As shown in FIG. 6, caul plies 1–8 are predeterminedly oriented in body 24k for positioning fibers 14 therein to decrease the bending flexibility, or correspondingly increase the rigidity, near caul root 24d and dovetail 24b for promoting directional consolidation. In FIG. 6, the fibers are oriented perpendicularly to each other in each sheet or ply at 0° and 90° relative to longitudinal axis 24c. Additionally, caul 24 illustrated in FIG. 6 includes two generally crescent-shaped cut-outs for effecting only one structural ply above root 24d and along the corresponding leading and trailing edges 24f and 24g for a suitable part-span extent. This affects the desired consolidation in the corresponding regions of the preform.

Figure 8:
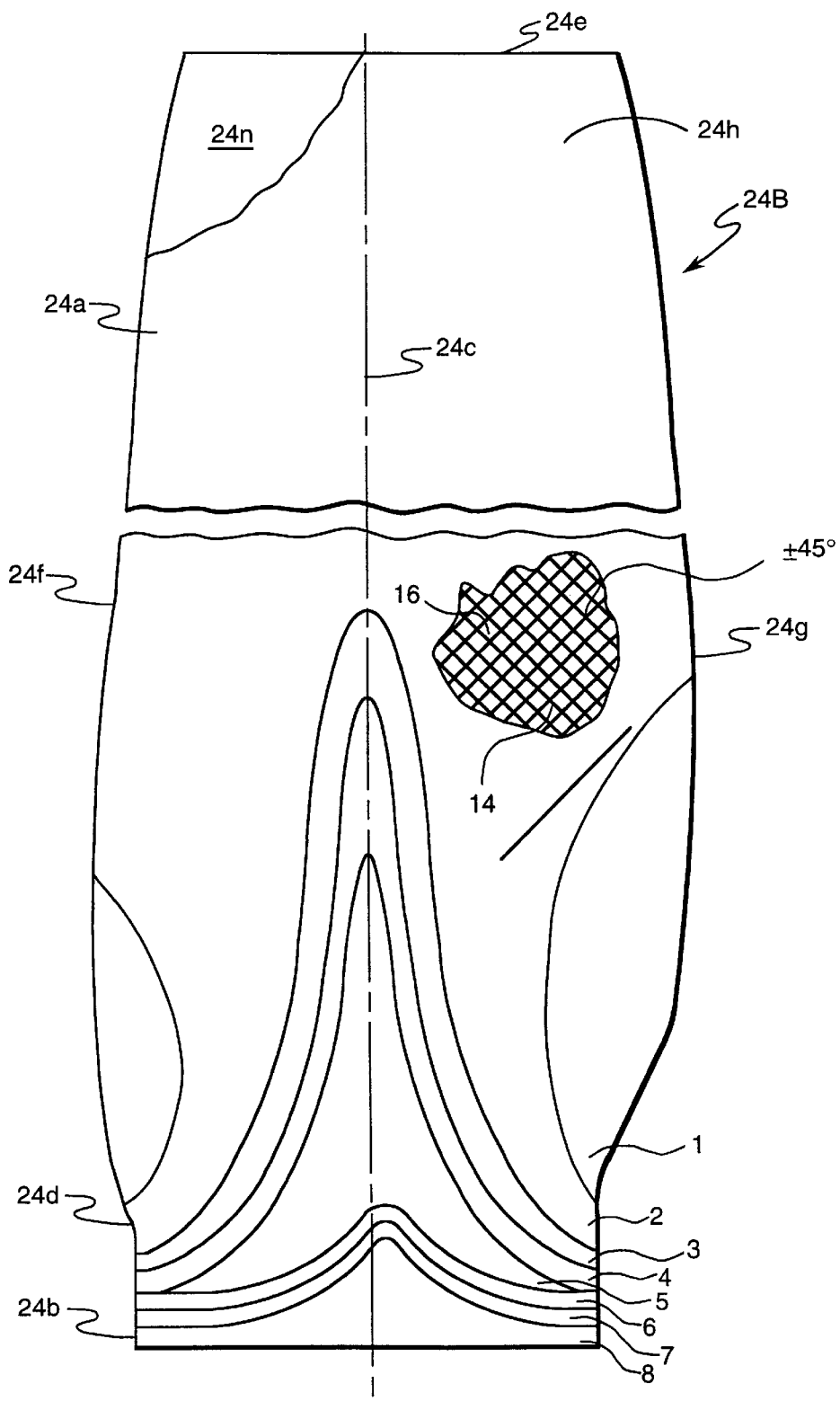
FIG. 8 is a plan view of the caul illustrated in FIG. 4 in accordance with a second embodiment of the present invention.

Illustrated in FIG. 8 is a second embodiment of a caul 24B which also includes eight plies 1–8 in a modified form of the configuration illustrated in FIG. 6. In the second embodiment, the caul plies 1–8 have the woven fibers 14 in each sheet being disposed perpendicularly to each other, but at ±45° relative to longitudinal axis 24c. The symmetric orientation of overlapping plies 1–8 provides additional plies along axis 24c in a centered peak extending to about the mid-span of airfoil 24a. This embodiment provides more uniform consolidation in the preform near its root and dovetail. As in the embodiment shown in FIG. 6, the thickness (and hence bending flexibility) along leading edge 24f if identical to that along trailing edge 249.

Figure 9:
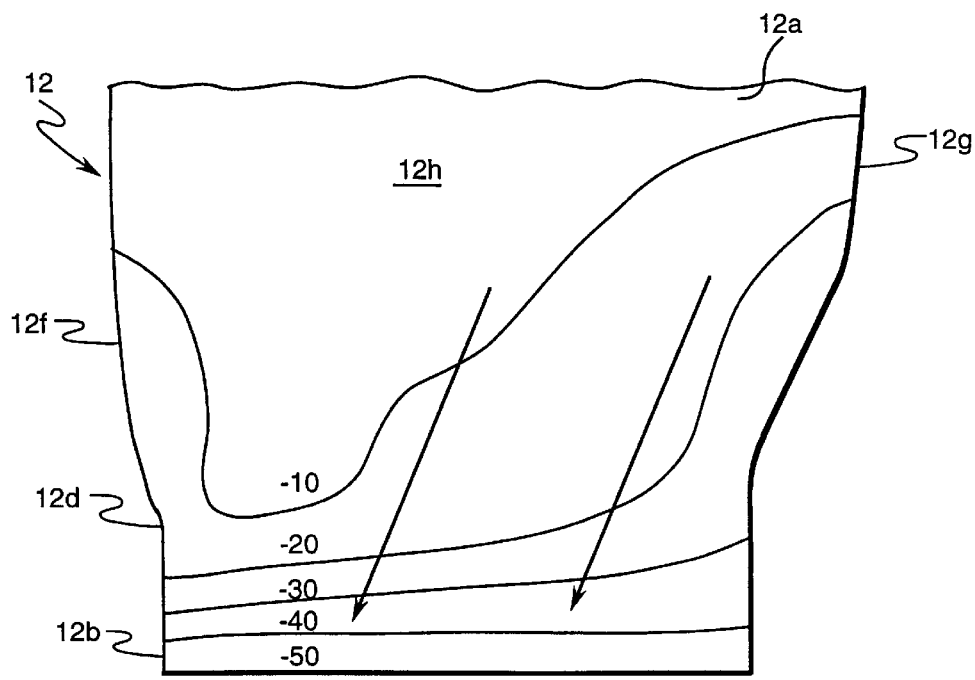
FIG. 9 is a schematic representation of isoclines of exemplary consolidation for the root and dovetail portion of the fan blade illustrated in FIG. 1 using the preform illustrated in FIG. 8.

FIG. 9 is a graphical representation of isoclines of consolidation for the embodiment of FIG. 8, expressed in relative numerical units for preform 12. The two arrows indicate the directions from minimum to maximum consolidation in preform root 12d and dovetail 12b. The FIG. 9 analytical depiction of this consolidation correlates with test results. The isoclines indicate more uniform consolidation along preform dovetail 12b which better corresponds to the required final configuration of the resulting fan blade with minimized consolidation distortion. FIG. 9 illustrates that less consolidation, e.g. minus 10 units, occurs in the airfoil and increases radially downwardly to the bottom of dovetail 12b having a magnitude of minus 50 units, for example. Caul 24 is therefore effective for not only providing increased consolidation and contraction at the relatively thicker dovetail 12b, but also for providing a suitable transition in consolidation to the reduced amount required in airfoil 12a without undesirable consolidation distortion.

The two embodiments illustrated in FIGS. 6 and 8 have similarity in the required number and configuration of the overlapping plies 1–8 for effecting desired variation in bending flexibility of cauls 24 and 24B, yet also exhibit subtle differences. For example, the designs are generally axisymmetrical about longitudinal axis 24c on the top side 24h. The bottom side 24j is typically single structural ply 1 extending over the entire surface thereof from leading to trailing edges, and from dovetail to tip, upon which the additional plies 2–8 are suitably stacked in desired locations. The maximum number of plies is at dovetail 24b, and decreases in number to root 24d, and further decreases in number part-span before remaining constant at two plies, for example, to the tip. Both designs include local cut-outs in second ply 2 to effect a single structural ply 1 for suitable part-span extent at the leading and trailing edges.

Of course, the design of the individual caul depends upon the desired final configuration of the fan blade itself. An individual caul design may therefore be made to a specific configuration of the fan blade. This may be accomplished by using conventional analytical tools to predict the complex three dimensional requirements of consolidation in the multi-ply preform, and therefore predicting a suitable configuration for the required caul.

The variable flexibility of the caul may be implemented in any suitable manner such as by using the variation in multiple plies 1–8, illustrated in FIGS. 6 and 8, with suitable configurations therefor. The number of plies may be changed, the orientation of the ply fibers may be changed, and the location of overlapping transition regions may also be changed in order to affect the resultant flexibility of the caul. The caul may therefore be tailored either analytically or by systematic variations in the operative parameters to create an optimum caul configuration for a specific part design. In this way, variation in preform consolidation may be optimized for significantly reducing defects such as wrinkles, porosity, and delamination which would otherwise occur without such controlled consolidation.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A caul for consolidating into a blade a composite preform having first and second opposite sides and a varying thickness therebetween, said preform being of greater thickness than the blade to be produced but identical in shape to the blade to be produced, said caul comprising a body complementary to said preform first side and having a bending flexibility varying over said body for correspondingly varying consolidation of said preform.

2. A caul according to claim 1 wherein said body varies in said flexibility over a range from a minimum to a maximum flexibility to correspond with maximum and minimum consolidation, respectively, in said preform.

3. A caul according to claim 2 wherein said body varies in thickness to effect said varying bending flexibility.

4. A caul according to claim 3 wherein said preform includes a root and a tip, said preform decreasing in thickness from said root to said tip, and wherein said caul body has a corresponding root and tip, and increases in said flexibility from the corresponding root to the corresponding tip.

5. A caul according to claim 4 wherein said body comprises a composite of fibers in a matrix.

6. A caul according to claim 5 wherein said body further comprises a plurality of plies of said fibers in said matrix, said plies increasing in quantity from the tip of said caul body to the root of said caul body.

7. A caul according to claim 6 wherein:

said preform is shaped in a gas turbine fan blade configuration with an airfoil defined radially between the preform root and preform tip and axially between a preform leading edge and a preform trailing edge, and with a dovetail integrally joined to said preform root;

said caul body correspondingly having a gas turbine fan blade configuration with an airfoil defined radially between the caul root and caul tip and axially between a caul leading edge and a caul trailing edge, and with a dovetail integrally joined to said caul root; and said caul plies being disposed generally symmetrically about a radial stacking axis of said caul body.

8. A caul according to claim 7 wherein said caul plies are oriented in said body for positioning said fibers therein to decrease said flexibility near said caul root and caul dovetail for promoting directional consolidation thereby.

9. A caul according to claim 7 further comprising:

a liner integrally joined to a bottom side of said caul body for engaging said preform first side and controlling surface finish thereof; and a protective cover integrally joined to a top side of said caul body.

10. A caul according to claim 7 wherein said preform includes a mid-chord section near the stacking axis being thicker than the leading and trailing edges, and wherein said caul body is thicker in a mid-chord section near the stacking axis than at the leading and trailing edge of the caul.

11. A caul according to claim 10 wherein said preform is twisted along said stacking axis.

12. Apparatus for consolidating into a blade a composite, multi-ply preform containing resin and having first and second sides, said apparatus comprising:

a caul of bending flexibility that varies over its body;

an autoclave chamber;

a bottom mold disposed in said chamber and configured to define said second side of said preform;

said preform being positionable atop said bottom mold with said second side thereof in contact therewith, said preform being of greater thickness than the blade to be produced but identical in shape to the blade to be produced;

said caul being positionable atop said preform;

a caul liner for contacting said preform first side; and means for heating and pressurizing said chamber to compress said caul atop said preform and consolidate the preform plies, whereby said preform can be compressed into a blade without relative movement between adjacent ones of the plies.

13. The apparatus of claim 12 wherein said preform includes a root and a tip and decreases in thickness from said root to said tip, and wherein said caul has a corresponding root and tip and increases in flexibility from the corresponding root to the corresponding tip, said caul comprising a body complementary to said preform first side and having a bending flexibility varying over said body for correspondingly varying consolidation of said preform.

14. The apparatus of claim 13 wherein said preform includes a mid-chord section near the stacking axis, a preform leading edge and a preform trailing edge, and wherein said caul body is thicker in a mid-chord section near the stacking axis than at a leading and a trailing edge of the caul.

15. The apparatus of claim 13 wherein said means for heating and pressurizing said chamber is adapted to provide sufficient heat to said preform to cure the resin in said preform.

16. The apparatus of claim 15 wherein said means for heating and pressurizing said chamber is adapted to provide less heat to said preform than needed to cure the resin in said preform, and thereafter to allow the preform to cool, prior to applying sufficient heat to said preform to cure the resin in said preform.

17. A process for consolidating into a blade a preform configured as a layup of a plurality of composite plies, comprising the steps of:

providing a preform having at least first and second sides and being of greater thickness than the blade to be produced but identical in shape to said blade to be produced;

providing a caul having first and second opposite sides and a varying thickness therebetween, the second side of said caul comprising a body conforming in shape to the first side of said preform and having a bending flexibility varying over said body for correspondingly varying consolidation of said preform;

positioning said preform on a mold within a pressure chamber, said mold being configured to define the second side of said preform;

positioning said caul within said pressure chamber on the first side of said preform;

heating said chamber; and pressurizing said chamber so as to reduce thickness of said preform by consolidating said plies into final shape without causing relative movement between adjacent ones of said plies.

18. The process of claim 16 including the steps of positioning a flexible vacuum sheet over the first side of said caul, and evacuating air from said preform, prior to the heating and pressurizing steps.

19. The process of claim 17 wherein the step of heating said chamber comprises providing sufficient heat to said preform to cure resin contained in said preform.

20. The process of claim 17 wherein the step of heating said chamber comprises:

providing less heat to said preform than needed to cure resin in said preform;

allowing the preform to cool; and applying sufficient heat to said preform to cure the resin in said preform.

21. The process of claim 18 wherein the step of heating said chamber comprises providing sufficient heat to said preform to cure resin contained in said preform.

* * * * *